United States Patent
Nishiki et al.

(10) Patent No.: US 11,212,206 B2
(45) Date of Patent: Dec. 28, 2021

(54) CONTROL DEVICE AND CONTROL METHOD

(71) Applicant: Nippon Telegraph and Telephone Corporation, Tokyo (JP)

(72) Inventors: Masayuki Nishiki, Tokyo (JP); Hiroshi Osawa, Tokyo (JP); Satoshi Nishiyama, Tokyo (JP); Takayuki Fujiwara, Tokyo (JP); Satomi Inoue, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/259,590

(22) PCT Filed: Jul. 19, 2019

(86) PCT No.: PCT/JP2019/028469
§ 371 (c)(1),
(2) Date: Jan. 12, 2021

(87) PCT Pub. No.: WO2020/017637
PCT Pub. Date: Jan. 23, 2020

(65) Prior Publication Data
US 2021/0336865 A1 Oct. 28, 2021

(30) Foreign Application Priority Data

Jul. 20, 2018 (JP) .............................. JP2018-136742

(51) Int. Cl.
*H04L 12/24* (2006.01)
*H04L 12/26* (2006.01)
(Continued)

(52) U.S. Cl.
CPC ...... *H04L 43/0882* (2013.01); *H04L 41/0896* (2013.01); *H04L 41/5035* (2013.01);
(Continued)

(58) Field of Classification Search
CPC ..... H04L 41/00; H04L 41/08; H04L 41/0896; H04L 41/50; H04L 41/5035; H04L 43/00;
(Continued)

(56) References Cited

U.S. PATENT DOCUMENTS 5,819,045 A * 10/1998 Raman .................... H04L 43/00
709/226
2015/0127789 A1 * 5/2015 Lissack ............... H04L 41/5022
709/221
(Continued)

OTHER PUBLICATIONS

Adoc.co.jp, [online], "OpenStack Challenge 18th HEAT Introduction," 2017, retrieved on Jun. 13, 2018, retrieved from URL<https://www.adoc.co.jp/blog/e000365.html>, 50 pages (with English Translation).

(Continued)

*Primary Examiner* — Boris D Grijalva Lobos
(74) *Attorney, Agent, or Firm* — Fish & Richardson P.C.

(57) ABSTRACT

A control system 10 may include a packet size analysis unit (14) that analyzes a distribution of packet sizes of traffic input to VNFs, a capacity calculation unit (123) that calculates a traffic volume per unit time processible by one VNF based on VNF capacity information indicating a traffic volume (bps, pps) per unit time processible by one VNF for a packet size and the distribution of the packet sizes input to the VNFs, and an installation number calculation unit (124) that calculates the number of VNFs to be increased or decreased based on the traffic volume per unit time processible by one VNF and the resource amount necessary for forwarding of the traffic.

6 Claims, 9 Drawing Sheets

(51) Int. Cl.
*H04L 12/803* (2013.01)
*H04L 12/851* (2013.01)

(52) U.S. Cl.
CPC ........ *H04L 43/062* (2013.01); *H04L 43/0811* (2013.01); *H04L 47/122* (2013.01); *H04L 47/2483* (2013.01)

(58) Field of Classification Search
CPC ............. H04L 43/06–067; H04L 43/08; H04L 43/0811; H04L 43/0876–0894; H04L 47/00; H04L 41/12–125; H04L 47/2483
See application file for complete search history.

(56) References Cited

U.S. PATENT DOCUMENTS

| | | | |
|---|---|---|---|
| 2017/0230267 A1* | 8/2017 | Armolavicius | H04L 41/20 |
| 2017/0353361 A1* | 12/2017 | Chopra | H04L 43/00 |
| 2018/0026911 A1* | 1/2018 | Anholt | H04L 41/5003 709/226 |
| 2019/0044838 A1* | 2/2019 | Yao | H04L 43/0811 |
| 2021/0250245 A1* | 8/2021 | Li | H04L 43/04 |

OTHER PUBLICATIONS

Cloud.nifty.com, [online], "Nifkula Specifications and Functions," 2018, retrieved on Jun. 13, 2018, retrieved from URL<https://cloud.nifty.com/service/autoscale.htm>, 9 pages (with English Translation).

Docs.microsoft.com, [online], "How to configure an automatic scale for cloud services with a portal," May 18, 2017, retrieved on Jun. 13, 2018, retrieved from URL<https://docs.microsoft.com/ja-jp/azure/cloud-services/cloud-services-how-to-scale-portal>, 10 pages (with English Translation).

* cited by examiner

CONTROL DEVICE AND CONTROL METHOD

CROSS-REFERENCE TO RELATED APPLICATIONS

This application is a National Stage application under 35 U.S.C. § 371 of International Application No. PCT/JP2019/028469, having an International Filing Date of Jul. 19, 2019, which claims priority to Japanese Application Serial No. 2018-136742, filed on Jul. 20, 2018. The disclosure of the prior application is considered part of the disclosure of this application, and is incorporated in its entirety into this application.

TECHNICAL FIELD

The present invention relates to a control device and a control method.

BACKGROUND ART

As a method of traffic monitoring or traffic analysis, there is a method of utilizing a flow collector such as netFlow. This flow collector monitors traffic in units of a destination address. When traffic suspected of attack is detected in the flow collector, a control device forwards the traffic to Virtual Network Functions (VNFs) for attack traffic, and performs detailed analysis. For example, vRouter and vMitigation are used as the VNFs for the above-described attack traffic. Here, when the traffic suspected of attack is detected, the control device needs to increase the number of VNFs depending on traffic volumes of traffic to be forwarded.

Here, traffic volumes (packets per second (pps), bit per second (bps)) transferable by the VNFs are different depending on the packet sizes of the traffic to be forwarded. Thus, it is necessary to take into account distribution characteristics of the packet sizes of the traffic to be forwarded in deciding the number of VNFs to be increased or decreased.

For example, although the number of VNFs to be increased or decreased is decided such that the number of transfer packets per time (pps) becomes large on the assumption that the percentage of short packets of the traffic to be forwarded is large, when the percentage of long packets is large, there is a concern that the VNFs are provided in excess.

CITATION LIST

Non Patent Literature

NPL1: NIFCLOUD, [search on Jul. 9, 2018], Internet <URL: https://cloud.nifty.com/service/autoscale.htm>
NPL2: How to configure auto scaling for a Cloud Service in the portal, [search on Jul. 9, 2018], Internet <URL: https://docs.microsoft.com/ja-jp/azure/cloud-services/cloud-services-how-to-scale-portal>
NPL3: The 18th OpenStack Challenge to introduce HEAT, [search on Jul. 9, 2018], Internet <URL: https://www.adoc.co.jp/blog/e000365.html>

SUMMARY OF THE INVENTION

Technical Problem

Here, in an existing traffic monitoring technology using the netFlow, it is difficult to grasp the distribution of the packet sizes of the traffic from a balance with the sampling rate of the traffic. Thus, it is not possible to provide appropriate VNF resources by taking into account the distribution characteristics of the packet sizes of the traffic. Thus, the present invention solves the problems, and is an object to provide the appropriate VNF resources by taking into account the distribution characteristics of the packet sizes of the traffic.

Means for Solving the Problem

To solve the problems, the present invention provides a control device that calculates the number of installed virtual network functions (VNFs) that process traffic. The control device includes a storage unit configured to store VNF capacity information indicating a traffic volume per unit time processible by one VNF of the VNFs for a packet size of traffic input to the VNFs, a packet size analysis unit configured to analyze a distribution of a plurality of the packet sizes of the traffic input to the VNFs, a capacity calculation unit configured to calculate the traffic volume per unit time processible by one VNF based on the VNF capacity information and the distribution of the packet sizes input to the VNFs, a necessary resource amount calculation unit configured to calculate a necessary resource amount which is a difference between a total resource amount necessary for forwarding of the traffic to the VNFs and a total resource amount provided by existing VNFs. and an installation number calculation unit configured to calculate the number of VNFs to be increased or decreased to process the traffic based on the traffic volume per unit time processible by one VNF, which is calculated by the capacity calculation unit, and the necessary resource amount calculated by the necessary resource amount calculation unit.

Effects of the Invention

According to the present invention, it is possible to provide appropriate VNF resources by taking into account distribution characteristics of packet sizes of traffic.

DESCRIPTION OF EMBODIMENTS

Hereinafter, modes for carrying out the present disclosure (hereinafter, referred to as an "embodiments") will be described with reference to the drawings. The embodiments include a first embodiment and a second embodiment separately described. The present invention is not limited to the embodiments.

Overview of Each Embodiment

First, a basic operation of a control device (control system) of each embodiment will be described with reference to FIG. 1. For example, when attack traffic is detected, a control system 10 forwards the traffic, and transfers the traffic to vRouters and vMitigations (VNFs) of the control system 10. The forwarded traffic reaches the vMitigation by the vRouter, and the vMitigation performs detailed analysis of the attack traffic, for example.

The control system 10 manages and controls the VNFs (resources), and increases or decreases the VNF as necessary.

For example, when a flow collector unit 11 within the control system 10 collects and monitors traffic of an edge router ((1)) and detects an attack such as a Distributed Denial of Service (DDoS) attack ((2)), the flow collector unit 11 notifies a resource control unit 12 that the attack is detected. The resource control unit 12 that receives the notification instructs an orchestrator unit 13 to increase or decrease the number of VNFs ((3)). Accordingly, the orchestrator unit 13 increases or decreases the number of VNFs.

Thereafter, the resource control unit 12 instructs the edge router to forward the attack traffic ((4) traffic forwarding instruction). Accordingly, the attack traffic is forwarded to the VNFs (VNF #1 to #N), and each VNF performs the detailed analysis of the attack traffic.

Figure 1:
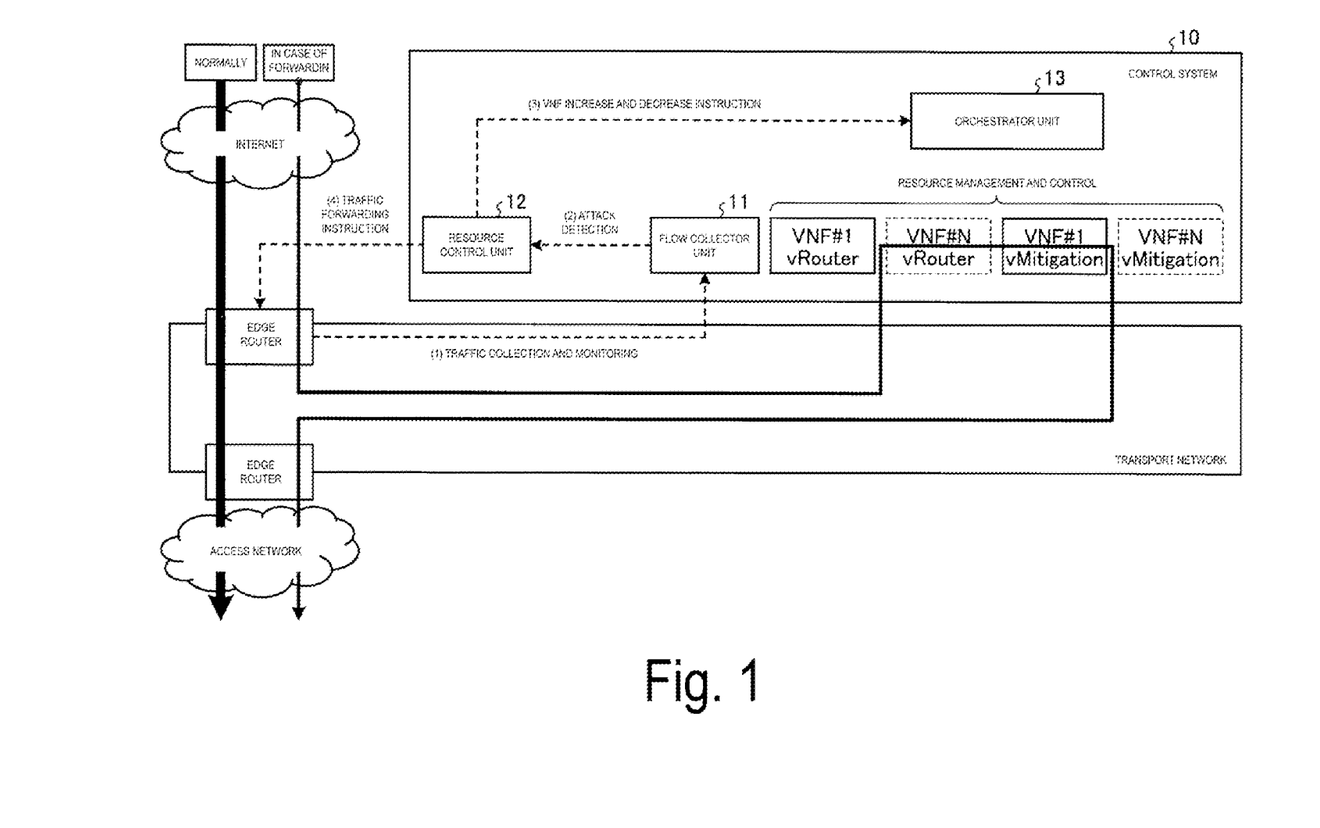
FIG. 1 is a diagram for describing a basic operation of a control system.

That is, for example, as illustrated in FIG. 1, the traffic including the attack traffic is normally transferred from the Internet to a transport network through the edge router and reaches an access network, but after the attack is detected (when the attack traffic is forward), the attack traffic is forwarded from the edge router via the VNFs #1 to #N.

Here, the control system 10 analyzes a distribution of packet sizes of the traffic to be forwarded (or forwarded traffic), and increases or decreases the number of VNFs that relay the traffic based on an analysis result. Accordingly, the control system 10 can provide the appropriate VNF resources by taking into account distribution characteristics of the packet sizes of the traffic.

The control system 10 of each embodiment may be realized, for example, by a virtualization infrastructure that controls a plurality of VNFs. The units of the control system 10 may also be provided within one device (for example, a server), or may be provided in individual devices, respectively.

First Embodiment

Next, the control system 10 according to a first embodiment will be described with reference to FIG. 2. The control system 10 first installs the VNFs on the assumption that the distribution of the packet sizes of the traffic is a short packet, and forwards the traffic. Thereafter, the control system 10 receives the analysis result of the packet sizes of the traffic input to the installed VNFs, and corrects the number of VNFs to be installed based on the analysis result.

The control system 10 includes the flow collector unit 11, the resource control unit 12, and the orchestrator unit 13. In the following description, the VNF activated (installed) from a resource pool is referred to as an existing VNF.

The flow collector unit 11 collects and monitors the traffic by a traffic monitoring unit 111. For example, the traffic monitoring unit 111 collects and monitors the traffic from the edge router. When the attack traffic is detected, the traffic monitoring unit 111 notifies the resource control unit 12 of a traffic volume of the traffic as a traffic volume of the traffic to be forwarded.

The resource control unit 12 calculates how much the resources (VNFs) may be provided. The resource control unit 12 includes a storage unit 130 and a capacity control unit 120.

The storage unit 130 stores various kinds of information used when the capacity control unit 120 calculates the number of VNFs. For example, the storage unit 130 stores total traffic volume information and VNF capacity information.

The total traffic volume information is information indicating traffic (existing forwarded traffic) already forwarded to the VNFs.

Figure 4:
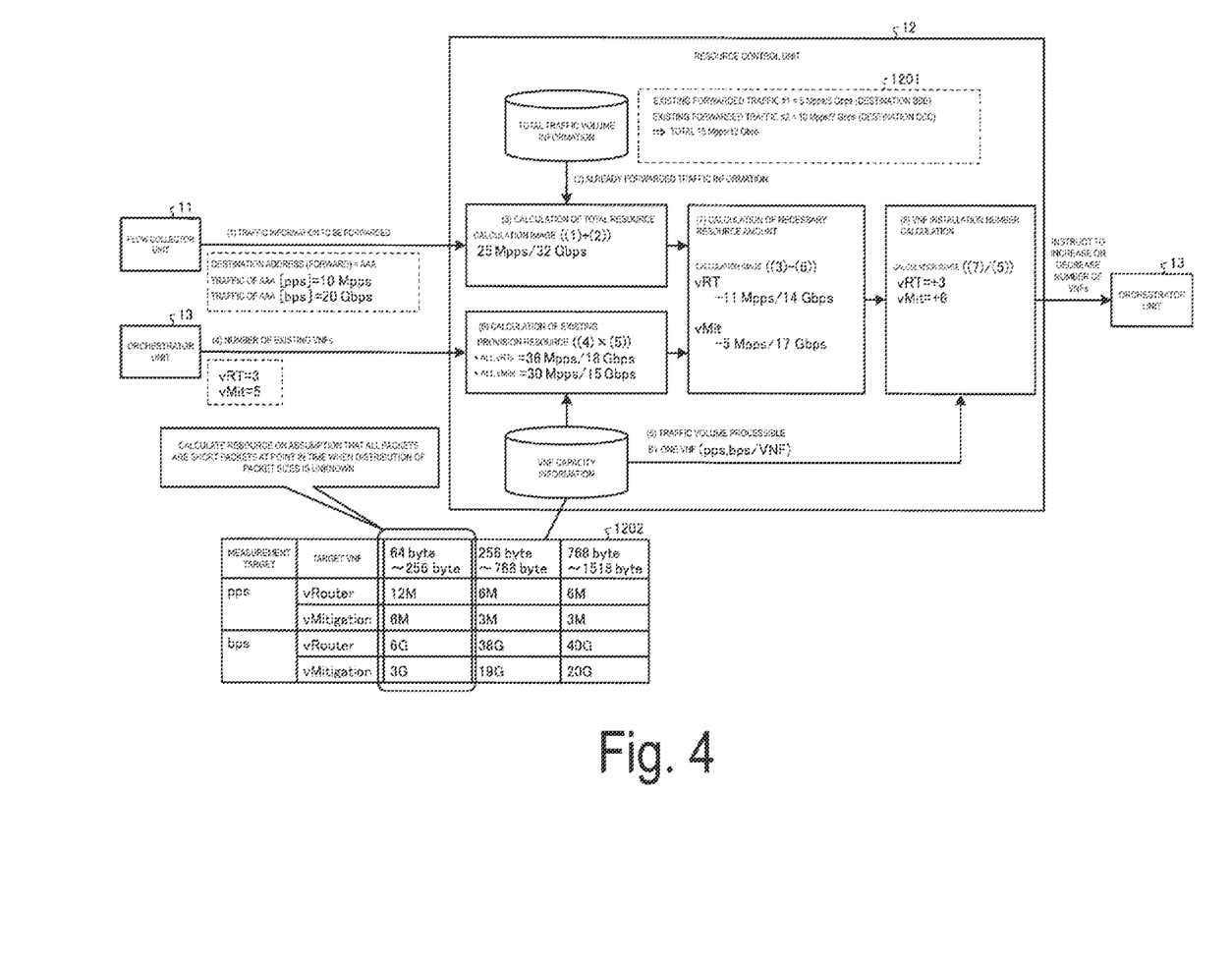
FIG. 4 is a diagram for describing an example of a processing procedure for increasing and decreasing the number of VNFs of the control system of FIG. 2.

For example, a traffic volume for each existing forwarded traffic is recorded as this total traffic volume information as indicated by a reference sign 1201 of FIG. 4. For example, the total traffic volume information indicated by the reference sign 1201 of FIG. 4 indicates that the traffic volume of the existing forwarded traffic #1 (destination BBB) is 5 Mpps/5 Gbps and the traffic volume of the existing forwarded traffic #2 (destination CCC) is 10 Mpps/7 Gbps. This total traffic volume information is updated by the resource control unit 12 with the start of the traffic forwarding to the VNFs or the end of the traffic forwarding.

Figure 2:
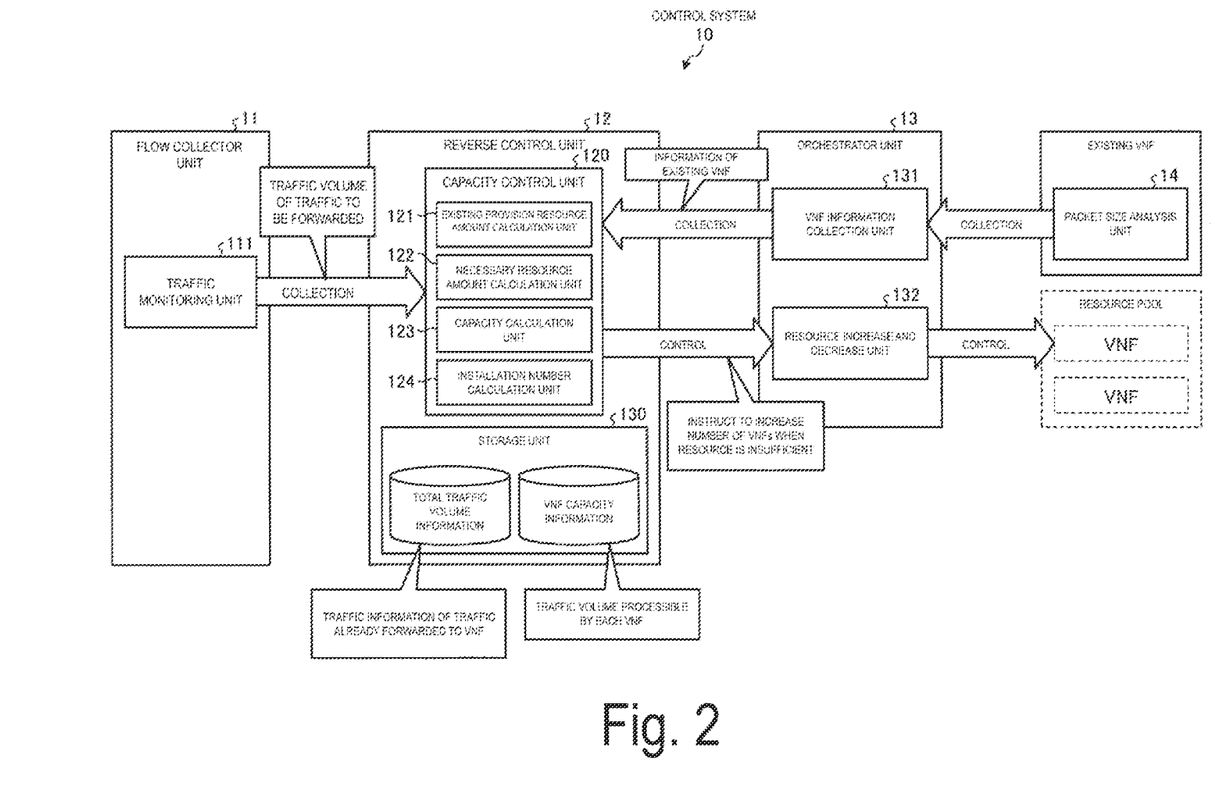
FIG. 2 is a diagram for describing a control system according to a first embodiment.

The VNF capacity information of FIG. 2 is information indicating traffic volumes (pps and bps) per unit time processible by target VNFs for each packet size of the traffic processed by the target VNFs.

This VNF capacity information is information indicating traffic volumes (pps and bps) per unit time processible by the target VNFs (vRouter and vMitigation) for each packet size of the traffic, for example, as indicated by reference sign 1202 in FIG. 4. For example, the VNF capacity information indicated by the reference sign 1202 indicates that the traffic volume processible by the vRouter is 12 M (pps)/6 G (bps), and the traffic volume processible by the vMitigation is 6 M (pps)/3 G (bps) for traffic having a packet size of 64 bytes to 256 bytes.

The capacity control unit 120 of FIG. 2 calculates how much the VNFs may be provided with the traffic forwarding, and instructs the orchestrator unit 13 to increase or decrease the number of VNFs based on a calculation result.

The capacity control unit 120 of FIG. 2 includes an existing provision resource amount calculation unit 121, a necessary resource amount calculation unit 122, a capacity calculation unit 123, and an installation number calculation unit 124.

The existing provision resource amount calculation unit 121 calculates a total resource amount provided by the existing VNFs.

For example, the existing provision resource amount calculation unit 121 acquires the number of existing VNFs from the orchestrator unit 13, and calculates a total volume of a traffic volume per unit time processible by the existing VNFs based on the number of existing VNFs and the VNF capacity information.

Details of the calculation of the total resource amount provided by the existing VNFs in the existing provision resource amount calculation unit 121 is described later in conjunction with a specific example.

The necessary resource amount calculation unit 122 calculates a necessary resource amount that is a difference between the total resource amount necessary for the traffic forwarding and the total resource amount provided by the existing VNFs.

Specifically, the necessary resource amount calculation unit 122 first calculates a total value (total resource amount necessary for the traffic forwarding) of the traffic volume already forwarded to the VNFs indicated by the total traffic volume information and the traffic volume to be forwarded which is acquired from the flow collector unit 11. Subsequently, the necessary resource amount calculation unit 122 calculates a difference (necessary resource amount) between the total resource amount necessary for the traffic forwarding and the total resource amount provided by the existing VNFs calculated by the existing provision resource amount calculation unit 121.

The capacity calculation unit 123 calculates the traffic volume per unit time processible by one VNF.

For example, the capacity calculation unit 123 receives the analysis result of the distribution of the packet sizes of the traffic input from the VNF to the VNF via the orchestrator unit 13. The capacity calculation unit 123 calculates the traffic volume per unit time processible by one VNF based on the received analysis result of the distribution of the packet sizes and the capacity (traffic volume (pps and bps) per unit time processible by the VNF) of the VNF for each packet size indicated by the VNF capacity information. Details of the calculation of the capacity of one VNF in the capacity calculation unit 123 are described later in conjunction with a specific example.

The installation number calculation unit 124 calculates the number of VNFs to be installed to relay the forwarded traffic based on the necessary resource amount calculated by the necessary resource amount calculation unit 122.

For example, the installation number calculation unit 124 calculates the number of VNFs to be installed by dividing the necessary resource amount calculated by the necessary resource amount calculation unit 122 by the traffic volume per unit time processible by one VNF which is calculated by the capacity calculation unit 123. When the necessary resource amount is a positive value, the calculated number of VNFs to be installed is the number of VNFs to be increased. When the necessary resource amount is a negative value, the calculated number of VNFs to be installed is the number of VNFs to be decreased. The installation number calculation unit 124 instructs the orchestrator unit 13 to increase or decrease the number of VNFs based on a calculation result of the number of VNFs to be installed. Details of the calculation of the number of VNFs to be installed in the installation number calculation unit 124 are also described below in conjunction with a specific example.

The orchestrator unit 13 controls and manages the VNFs. The orchestrator unit 13 includes a VNF information collection unit 131 and a resource increase and decrease unit 132.

The VNF information collection unit 131 collects various kinds of information regarding the VNFs from the existing VNFs, and outputs the information to the resource control unit 12. For example, the VNF information collection unit 131 collects the analysis result of the distribution of the packet sizes of the traffic relayed by the VNFs from the existing VNFs, and outputs the collected analysis result to the resource control unit 12. The VNF information collection unit 131 outputs the information on the existing VNFs (for example, the number of existing VNFs) to the resource control unit 12.

The resource increase and decrease unit 132 increases or decreases the number of VNFs based on an instruction from the resource control unit 12. For example, the resource increase and decrease unit 132 increases the number of VNFs by activating the VNFs of the resource pool based on an instruction from the resource control unit 12, and decreases the number of VNFs by stopping the existing VNFs.

Each of the existing VNFs includes a packet size analysis unit 14. This packet size analysis unit 14 analyzes the distribution of the packet sizes of the input traffic. According to the analysis result of the distribution of the packet sizes, for example, a distribution ratio of the packets having 64 bytes to 256 bytes is 0(%), a distribution ratio of the packets having 256 bytes to 768 bytes is 50(%), and a distribution ratio of the packets having 768 bytes to 1518 bytes is 50(%) as indicated by a reference sign 1301 of FIG. 5.

Figure 3:
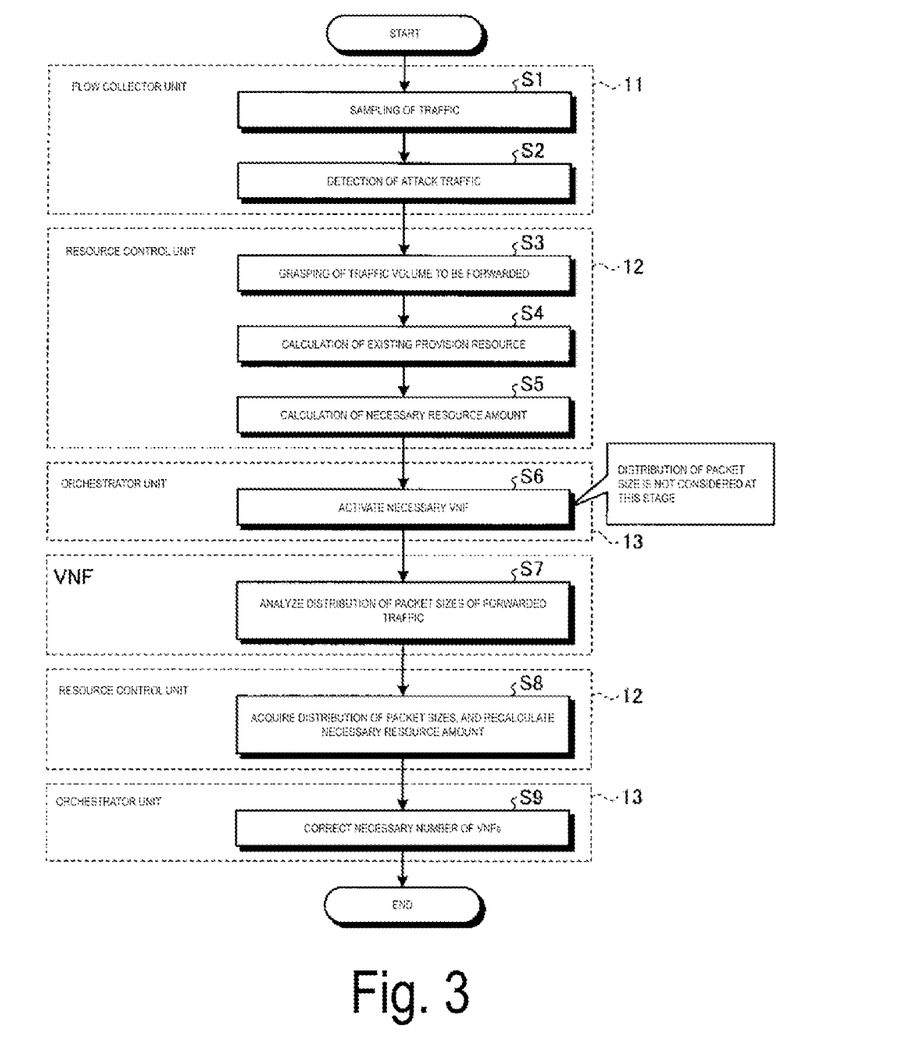
FIG. 3 is a flowchart illustrating an example of a processing procedure of the control system of FIG. 2.

Next, an example of a processing procedure of the control system 10 will be described with reference to FIG. 3. First, the traffic monitoring unit 111 of the flow collector unit 11 performs sampling of the traffic (S1), and proceeds to S3 when the attack traffic is detected (S2).

After S2, the necessary resource amount calculation unit 122 of the resource control unit 12 acquires the traffic volume of the traffic (for example, the above-described attack traffic) to be forwarded from the flow collector unit 11 (S3: grasping of traffic volume to be forwarded).

After S3, the existing provision resource amount calculation unit 121 of the resource control unit 12 calculates an existing provision resource amount (S4). For example, the existing provision resource amount calculation unit 121 acquires the number of existing VNFs from the orchestrator unit 13. The existing provision resource amount calculation unit 121 calculates the total volume (existing provision resource amount) of the traffic volumes per unit time processible by the existing VNFs based on the acquired number of existing VNFs and the VNF capacity information.

After S4, the necessary resource amount calculation unit 122 of the resource control unit 12 calculates the necessary resource amount (S5). For example, the necessary resource amount calculation unit 122 calculates, as the total resource amount necessary for the traffic forwarding, the total value of the traffic volume already forwarded to the VNFs indicated by the total traffic volume information and the traffic volume to be forwarded which is acquired in S3. Subsequently, the necessary resource amount calculation unit 122 calculates the difference (necessary resource amount) between the total resource amount necessary for the traffic forwarding and the existing provision resource amount calculated in S4.

Thereafter, the installation number calculation unit 124 calculates the number of VNFs to be installed based on the necessary resource amount. At this stage, the forwarding of the traffic to the VNFs is not performed yet, and thus, the distribution of the packet sizes of the traffic is unknown. Thus, the installation number calculation unit 124 calculates the number of VNFs to be installed (the number of VNFs to be increased or the number of VNFs to be decreased) on the assumption that all the packet sizes of the traffic are short packets (for example, packets having 64 bytes to 256 bytes). The installation number calculation unit 124 instructs the orchestrator unit 13 to activate the VNFs corresponding to the calculated number of VNFs to be installed. Accordingly, the resource increase and decrease unit 132 of the orchestrator unit 13 activates the necessary VNFs (S6).

After S6, the traffic is forwarded to the activated VNFs, and the VNFs starts processing of the traffic (forwarded traffic). The packet size analysis unit 14 of the VNF analyzes the distribution of the packet sizes of the forwarded traffic (S7).

After S7, the resource control unit 12 recalculates the necessary resource amount (S8).

That is, first, the capacity calculation unit 123 of the resource control unit 12 acquires the distribution of the packet sizes of the forwarded traffic analyzed in S7 via the orchestrator unit 13. Thereafter, the capacity calculation unit 123 calculates the traffic volume per unit time processible by one VNF based on the distribution of the packet sizes of the forwarded traffic and the VNF capacity information. Subsequently, the existing provision resource amount calculation unit 121 recalculates the total volume (existing provision resource amount) of the traffic volume per unit time processible by the existing VNFs based on the traffic volume per unit time processible by one VNF which is calculated by the capacity calculation unit 123. The necessary resource amount calculation unit 122 calculates the difference (necessary resource amount) between the total resource amount necessary for the traffic forwarding and the recalculated existing provision resource amount.

Thereafter, the installation number calculation unit 124 recalculates the number of VNFs to be installed based on the calculated necessary resource amount and the traffic volume per unit time processible by one VNF which is calculated by the capacity calculation unit 123. The installation number calculation unit 124 instructs the orchestrator unit 13 to activate the recalculated number of VNFs. The resource increase and decrease unit 132 of the orchestrator unit 13 corrects the necessary number of VNFs based on the instruction (S9). That is, the resource increase and decrease unit 132 decreases or increases the number of VNFs activated in S6.

By doing this, the control system 10 can provide the appropriate number of VNFs depending on the distribution of the packet sizes of the traffic.

Figure 5:
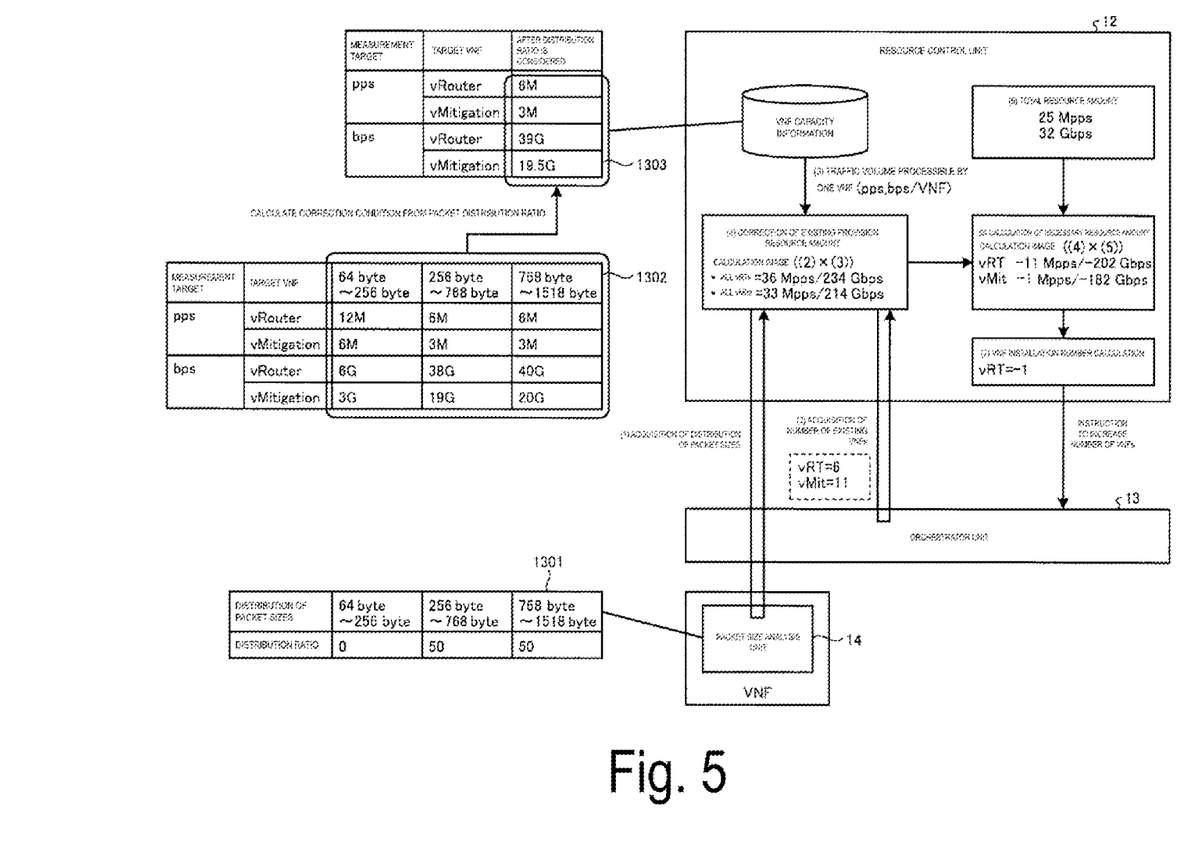
FIG. 5 is a diagram for describing an example of a processing procedure for increasing and decreasing the number of VNFs of the control system of FIG. 2.

Next, examples of processing procedures for increasing and decreasing the number of VNFs in the control system 10 will be described with reference to FIGS. 4 and 5.

First, the necessary resource amount calculation unit 122 of the resource control unit 12 acquires traffic information to be forwarded from the flow collector unit 11 ((1) of FIG. 4). For example, the necessary resource amount calculation unit 122 acquires, as the traffic information to be forwarded, information indicating that a destination address of the traffic to be forwarded is AAA, the traffic [pps] of the AAA is 10 Mpps, and the traffic [bps] of the AAA is 20 Gbps.

The necessary resource amount calculation unit 122 acquires the already forwarded traffic information (the traffic volume of the existing forwarded traffic) from the total traffic volume information ((2)). For example, the necessary resource amount calculation unit 122 acquires information indicating that the traffic volume of the existing forwarded traffic #1 (destination BBB) is 5 Mpps/5 Gbps and the traffic volume of the existing forwarded traffic #2 (destination CCC) is 10 Mpps/7 Gbps from the total traffic volume information, and obtains the total value (15 Mpps/12 Gbps) of these traffic volumes.

Subsequently, the necessary resource amount calculation unit 122 calculates the total resource amount based on the traffic information to be forwarded which is acquired in (1) and the traffic information already forwarded which is acquired in (2) ((3)). For example, the necessary resource amount calculation unit 122 obtains the total resource amount (25 Mpps/32 Gbps) by summing the traffic volume (10 Mpps/20 Gbps) of the traffic to be forwarded which is acquired in (1) and the traffic volume (15 Mpps/12 Gbps) already forwarded which is calculated in (2).

The existing provision resource amount calculation unit 121 acquires the number of existing VNFs from the orchestrator unit 13 ((4)). For example, the existing provision resource amount calculation unit 121 acquires information indicating that the number of existing vRouters (vRTs) is three and the number of existing vMitigations (vMits) is five.

Thereafter, the existing provision resource amount calculation unit 121 acquires the traffic volume (pps, pps/VNF) processible by one VNF from the VNF capacity information ((5)). The existing provision resource amount calculation unit 121 calculates the resources on the assumption that all the packets are short packets at a point in time when the packet sizes of the traffic to be forwarded are unknown. That is, the packet sizes of the traffic to be forwarded are unknown at this point in time, and thus, the existing provision resource amount calculation unit 121 acquires the traffic volume (pps, pps/VNF) processible by one VNF from the VNF capacity information on the assumption that all the packets of the traffic to be forwarded are short packets.

For example, when the VNF capacity information is information indicated by the reference sign 1202, the existing provision resource amount calculation unit 121 acquires information indicating that the traffic volume processible by the vRouter is 12 M (pps)/6 G (bps) and the traffic volume processible by the vMitigation is 6 M (pps)/3 G (bps) on the assumption that the packet sizes of the traffic to be forwarded are 64 bytes to 256 bytes.

The existing provision resource amount calculation unit 121 calculates the existing provision resource amount by multiplying the number of existing VNFs acquired in (4) by the traffic volume (pps, bps/VNF) processible by one VNF acquired in (5) ((6)).

For example, the existing provision resource amount calculation unit 121 obtains a calculation result indicating that a provision resource amount (traffic volume) of all the vRouters (vRTs) among the existing VNFs is 3×(12 Mpps/6 Gpps)=36 Mpps/18 Gbps and a provision resource amount of all the vMitigations (vMits) is 5×(6 Mpps/3 Gpps)=30 Mpps/15 Gbps.

Subsequently, the necessary resource amount calculation unit 122 calculates the necessary resource amount by calculating the difference between the total resource amount ((3)) and the existing provision resource amount calculated in (6) ((7)). For example, the necessary resource amount calculation unit 122 subtracts the provision resource amount (36 Mpps/18 Gbps) of all the vRTs and the provision resource amount (30 Mpps/15 Gbps) of all the vMits which are calculated in (6) from the total resource amount (25 Mpps/32 Gbps). Accordingly, the necessary resource amount calculation unit 122 obtains the calculation result indicating that the necessary resource amount of the vRTs is −11 Mpps/14 Gbps and the necessary resource amount of the vMits is −5 Mpps/17 Gbps.

Thereafter, the installation number calculation unit 124 calculates the number of VNFs to be installed to relay the forwarded traffic based on the traffic volume processible by one VNF which is calculated in (5) and the necessary resource amount calculated in (7) ((8) VNF installation number calculation).

For example, the installation number calculation unit 124 obtains a calculation result indicating that the number of vRTs is +3 (three vRTs are increased) and the number of vMits is +6 (six vMits are increased) by dividing the necessary resource amounts (vRT=−11 Mpps/14 Gbps, vMit=−5 Mpps/17 Gbps) calculated in (7) by the traffic volume processible by one VNF which is calculated in (5).

Thereafter, the installation number calculation unit 124 instructs the orchestrator unit 13 to increase or decrease the number of VNFs (vRTs and vMits) based on a calculation result obtained in (8). The orchestrator unit 13 increases or decreases the number of VNFs based on the instruction, and the installed VNFs perform the processing of the forwarded traffic.

The description will now be given with reference to FIG. 5. The packet size analysis unit 14 of the VNF analyzes the distribution of the packet sizes of the traffic forwarded to the VNF. The resource control unit 12 acquires the distribution of the packet sizes of the forwarded traffic from the VNF ((1) of FIG. 5). The resource control unit 12 acquires the number of existing VNFs from the orchestrator unit 13 ((2)).

The resource control unit 12 calculates the traffic volume (pps, bps/VNF) processible by one VNF based on the distribution of the packet sizes of the forwarded traffic which is acquired in (1) and the VNF capacity information (3). Subsequently, the resource control unit 12 calculates the existing provision resource amount by multiplying the number of existing VNFs acquired in (2) by the traffic volume processible by one VNF which is calculated in (3). That is, the resource control unit 12 corrects the existing provision resource amount based on the distribution of the packet sizes of the forwarded traffic ((4) correction of existing provision resource amount).

For example, the capacity calculation unit 123 of the resource control unit 12 acquires the distribution of the packet sizes indicated by the reference sign 1301 (the distribution ratio of the packets having 64 bytes to 256 bytes is 0(%), the distribution ratio of the packets having 256 bytes to 768 bytes is 50(%), and the distribution ratio of the packets having 768 bytes to 1518 bytes is 50(%)) from the VNF.

The capacity calculation unit 123 calculates values obtained by reducing the traffic volume when the packets having 256 bytes to 768 bytes indicated by the VNF capacity information (see the reference sign 1302) and the traffic volume when the packets having 768 bytes to 1518 bytes are processed based on the distribution of the packet sizes by 50%. For example, as indicated by the reference sign 1303, the capacity calculation unit 123 calculates the values indicating that the traffic volume (pps) processible by one vRouter is 6 Mpps, the traffic volume (pps) processible by one vMitigation is 3 Mpps, the traffic volume (bps) processible by one vRouter is 39 Gbps, and the traffic volume (bps) processible by one vMitigation is 19.5 Mpps.

The existing provision resource amount calculation unit 121 calculates the value obtained by multiplying the number of existing VNFs (for example, vRT=6, vMit=11) which is acquired in (2) by the traffic volume (pps, bps) processible by the one VNF (vRT and vMit) calculated in (3).

For example, the existing provision resource amount calculation unit 121 obtains a calculation result indicating that the existing provision resource amount of all the vRTs=6×(6 Mpps/39 Gbps)=36 Mpps/234 Gbps and the existing provision resource amount of all the vMits=11×(3 Gpps/19.5 Gbps)=33 Mpps/214 Gbps. In the calculation result, numbers below a decimal point are rounded to the nearest whole number.

Thereafter, the necessary resource amount calculation unit 122 calculates the necessary resource amount by calculating the difference between (5) the total resource amount (total resource amount calculated in (3) of FIG. 4) and the existing provision resource amount corrected in (4) ((6)).

For example, the necessary resource amount calculation unit 122 obtains a calculation result indicating that when the difference between (5) the total resource amount (25 Mpps/32 Gbps) and the existing provision resource amount (the provision resource amount (36 Mpps/234 Gbps) of all the vRTs and the provision resource amount (33 Mpps/214 Gbps) of all the VMits) corrected in (4) is calculated, the necessary resource amount of the vRT is −11 Mpps/−202 Gbps and the necessary resource amount of the vMit is −1 Mpps/−182 Gbps.

Thereafter, the installation number calculation unit 124 calculates the number of VNFs to be installed based on the traffic volume processible by one VNF which is calculated in (3) and the necessary resource amount calculated in (6) ((7) VNF installation number calculation).

For example, the installation number calculation unit 124 obtains a calculation result indicating that vRT=−1 (one vRT is decreased) by dividing the necessary resource amount (vRT=−11 Mpps/−202 Gbps. vMit=−1 Mpps/−182 Gbps) calculated in (6) by the traffic volume processible by one VNF which is calculated in (3).

Thereafter, the installation number calculation unit 124 instructs the orchestrator unit 13 to increase or decrease the number of VNFs (vRTs and vMits) based on the calculation result obtained in (7). For example, the installation number calculation unit 124 instructs the orchestrator unit 13 to decrease the number of vRTs by one. The orchestrator unit 13 decreases the number of VNFs (vRTs) based on the instruction.

By doing this, the control system 10 can increase or decrease the number of VNFs by taking into account the distribution characteristics of the packet sizes of the traffic. For example, the control system 10 collects the analysis result of the distribution of the packet sizes of the traffic input to the VNF from the existing VNF, and corrects the number of VNFs to be installed based on the analysis result. Thus, even though the distribution of the packet sizes of the traffic is changed, it is possible to increase or decrease the number of VNFs by dynamically coping with such a change.

Although it has been described in the first embodiment that the packet size analysis unit 14 is provided within the existing VNF, the packet size analysis unit 14 may be installed outside of the existing VNF as long as the distribution of the packet sizes of the traffic forwarded to the VNF can be analyzed.

Second Embodiment

Next, a second embodiment of the present invention will be described. Configurations that are the same as those in the first embodiment are denoted with the same reference signs, and the description thereof will be omitted.

Figure 6:
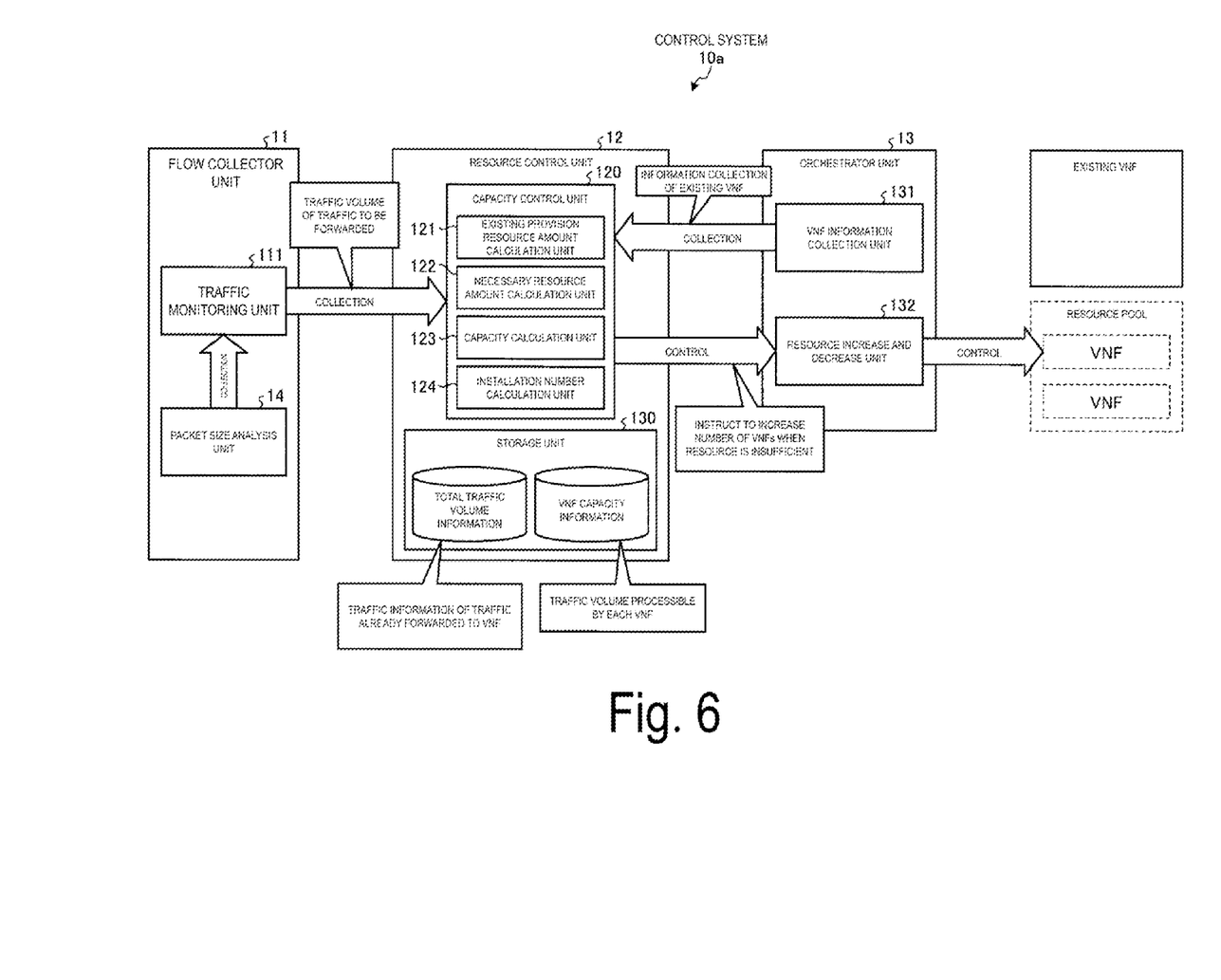
FIG. 6 is a diagram for describing a control system according to a second embodiment.

In a control system 10a of the second embodiment, the packet size analysis unit 14 is provided in the flow collector unit 11 (see FIG. 6). That is, the packet size analysis unit 14 analyzes the distribution of the packet sizes of the traffic sampled by the traffic monitoring unit 111 of the flow collector unit 11.

For example, when the attack traffic is detected, the traffic monitoring unit 111 of the flow collector unit 11 increases a sampling rate of the traffic. Subsequently, after the attack traffic is detected, the packet size analysis unit 14 analyzes the distribution of the packet sizes of the traffic (attack traffic) sampled by the traffic monitoring unit 111. The resource control unit 12 calculates the number of VNFs to be installed based on the distribution of the packet sizes of the traffic acquired from the flow collector unit 11.

Figure 7:
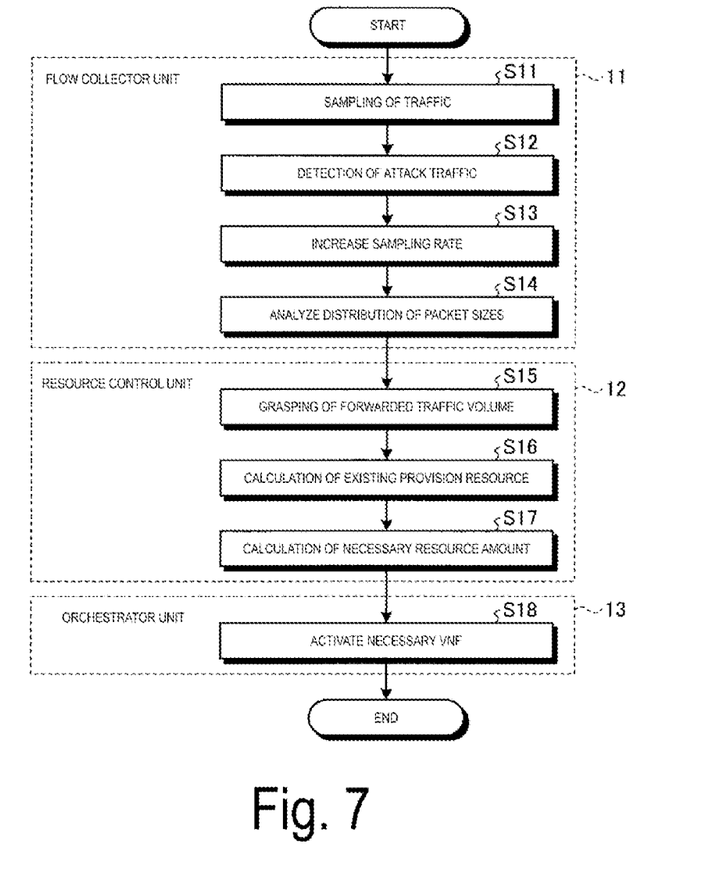
FIG. 7 is a flowchart illustrating an example of a processing procedure of the control system of FIG. 6.

Next, an example of a processing procedure of the control system 10a will be described with reference to FIG. 7. First, the traffic monitoring unit 111 of the flow collector unit 11 performs sampling of the traffic (S11), and increases a sampling rate when the attack traffic is detected (S12) (S13). Thereafter, the packet size analysis unit 14 analyzes the distribution of the packet sizes of the traffic sampled by the traffic monitoring unit 111 (S14).

After S14, the resource control unit 12 grasps the traffic volume to be forwarded by acquiring the traffic volume of the attack traffic (traffic to be forwarded) from the flow collector unit 11 (S15). The resource control unit 12 acquires the distribution of the packet sizes of the attack traffic (traffic to be forwarded) from the flow collector unit 11.

The existing provision resource amount calculation unit 121 of the resource control unit 12 calculates the existing provision resource amount (S16). That is, first, the capacity calculation unit 123 calculates the traffic volume per unit time processible by one VNF based on the distribution of the packet sizes acquired from the flow collector unit 11 and the VNF capacity information. Subsequently, the existing provision resource amount calculation unit 121 acquires the number of existing VNFs from the orchestrator unit 13. The existing provision resource amount calculation unit 121 calculates the total volume (existing provision resource amount) of the traffic volume per unit time processible by the existing VNF based on the acquired number of existing VNFs and the traffic volume per unit time processible by one VNF which is calculated by the capacity calculation unit 123.

After S16, the necessary resource amount calculation unit 122 calculates the necessary resource amount (S17). For example, the necessary resource amount calculation unit 122 calculates the total value (total resource amount necessary for the traffic forwarding) of the traffic volume already forwarded to the VNF indicated by the total traffic volume information and the traffic volume to be forwarded which is acquired in S15. The necessary resource amount calculation unit 122 calculates the difference (necessary resource amount) between the total resource amount necessary for the traffic forwarding and the existing provision resource amount calculated in S16.

After S17, the installation number calculation unit 124 calculates the number of VNFs to be installed based on the necessary resource amount calculated in S17 and the traffic volume per unit time processible by one VNF which is calculated by the capacity calculation unit 123. The installation number calculation unit 124 instructs the orchestrator unit 13 to activate the calculated number of VNFs. Accordingly, the resource increase and decrease unit 132 of the orchestrator unit 13 activates the necessary VNFs (S18).

According to such a control system 10a, the distribution of the packet sizes of the forwarded traffic is analyzed and the VNF is installed, and thus, it is not necessary to correct the number of VNFs to be installed as in the control system 10 of the first embodiment.

Other Embodiments

In the control system 10a of the second embodiment, the packet size analysis unit 14 may constantly analyze the distribution of the packet sizes of the traffic sampled by the traffic monitoring unit 111 regardless of the detection of the attack traffic by the traffic monitoring unit 111.

Figure 8:
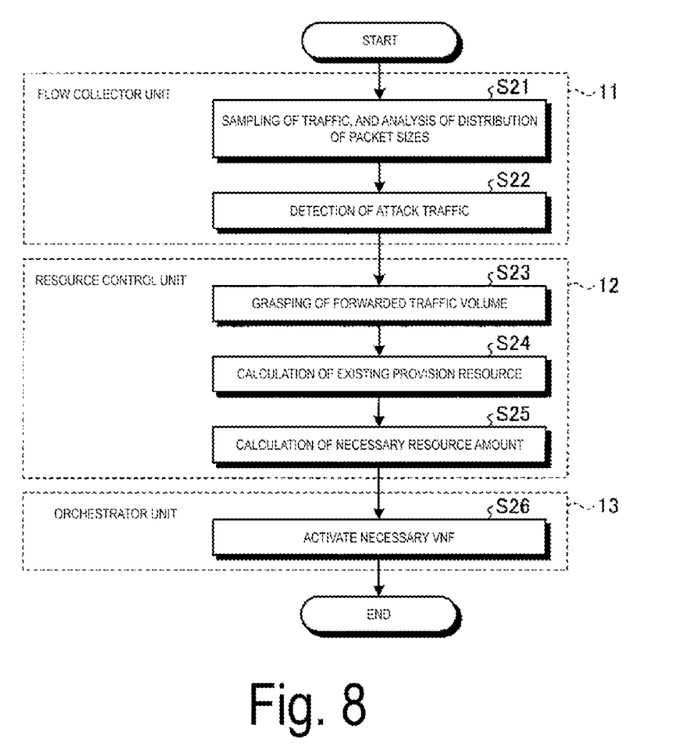
FIG. 8 is a flowchart illustrating an example of a processing procedure in a modification example of the control system of the second embodiment.

In this case, the traffic monitoring unit 111 of the flow collector unit 11 of the control system 10a performs the sampling of the traffic, and the packet size analysis unit 14 analyzes the distribution of the packet sizes of the traffic sampled by the traffic monitoring unit 111 (S21 of FIG. 8: analysis of sampling of traffic and distribution of packet sizes). Then, when the traffic monitoring unit 111 detects the attack traffic (S22), the resource control unit 12 executes processing of S23 to S26 by using the distribution of the packet sizes of the attack traffic detected in S22 from the distribution of the packet sizes obtained in S21. That is, the resource control unit 12 executes the same processing as the processing of S15 to S18 of FIG. 7 by using the distribution of the packet sizes of the attack traffic detected in S22 from the distribution of the packet sizes obtained in S21. For example, in S23 of FIG. 8, when the traffic volume processible per unit time by one VNF is calculated, the capacity calculation unit 123 calculates the traffic volume per unit time processible by one VNF by using the distribution of the packet sizes of the attack traffic detected in S22 from the distribution of the packet sizes obtained in S21.

According to such a control system 10a, the packet size analysis unit 14 constantly analyzes the distribution of the packet sizes of the traffic sampled by the traffic monitoring unit 111. Thus, even though the distribution of the packet sizes of the forward traffic is changed, the resource control unit 12 can increase or decrease the number of VNF to be installed according to such a change.

Program

A program that realizes the functions of the control systems 10 and 10a described in the aforementioned embodiments can be implemented by being installed on a desired information processing apparatus (computer). For example, an information processing apparatus can function as the control systems 10 and 10a by causing the information processing apparatus to execute the program provided as package software or online software. The information processing apparatus described here includes a desktop or laptop personal computer and a laptop server computer. In addition, the information processing apparatus includes a mobile communication terminal such as a smart phone, a mobile phone, and a Personal Handyphone System (PHS), as well as Personal Digital Assistant (PDA). The control systems 10 and 10a may also be implemented in a cloud server.

Figure 9:
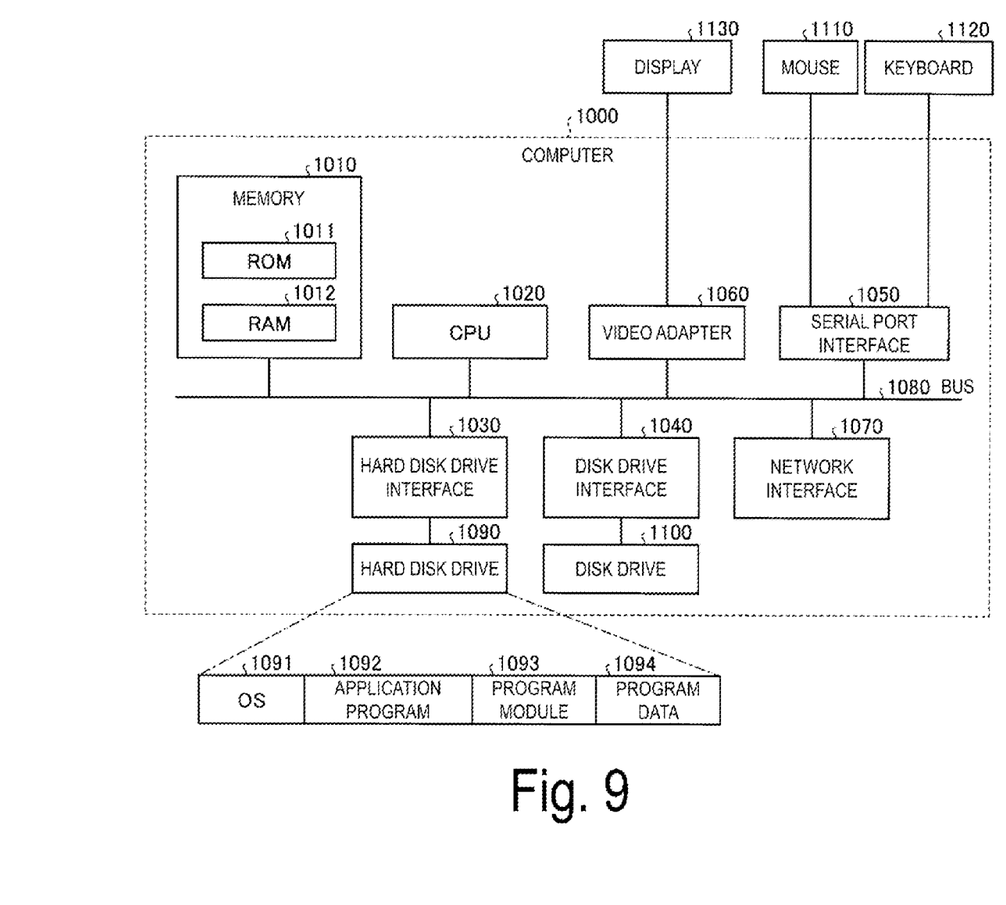
FIG. 9 is a diagram illustrating an example of a computer that executes a control program.

An example of a computer that executes the program (abnormal detection program) described above will be described with reference to FIG. 9. As illustrated in FIG. 9, a computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes Read Only Memory (ROM) 1011 and a Random Access Memory (RAM) 1012. The ROM 1011 stores a boot program, such as Basic Input Output System (BIOS), for example. The hard disk drive interface 1030 is connected to a hard disk drive 1090. The disk drive interface 1040 is connected to a disk drive 1100. A removable storage medium, such as a magnetic disk or an optical disk for example, is inserted into the disk drive 1100. A mouse 1110 and a keyboard 1120, for example, are connected to the serial port interface 1050. A display 1130, for example, is connected to the video adapter 1060.

Here, the hard disk drive 1090 stores, for example, an OS 1091, an application program 1092, a program module 1093, and program data 1094 as illustrated in FIG. 9. The various types of data and information described in the aforementioned embodiments are stored in, for example, the hard disk drive 1090 and the memory 1010.

The CPU 1020 loads the program module 1093 and the program data 1094, stored in the hard disk drive 1090, onto the RAM 1012 as appropriate, and executes each of the aforementioned procedures.

The program module 1093 or the program data 1094 related to the abnormal detection program described above is not limited to a case where the program module 1093 and the program data 1094 are stored in the hard disk drive 1090. For example, the program module 1093 and the program data 1094 may be stored in a removable storage medium, and may be read out by the CPU 1020 via the disk drive 1100. Alternatively, the program module 1093 and the program data 1094 related to the program may be stored in another computer connected via a network such as a LAN or a Wide Area Network (WAN), and may be read by the CPU 1020 via the network interface 1070.

REFERENCE SIGNS LIST

- 10, 10a Control system
- 11 Flow collector unit
- 12 Resource control unit
- 13 Orchestrator unit
- 14 Packet size analysis unit
- 120 Capacity control unit
- 121 Existing provision resource amount calculation unit
- 122 Necessary resource amount calculation unit
- 123 Capacity calculation unit
- 124 Installation number calculation unit
- 130 Storage unit
- 131 VNF information collection unit
- 132 Resource increase and decrease unit

The invention claimed is:

1. A control device that calculates a number of Virtual Network Functions (VNFs) to be installed to process traffic, the control device comprising:
    a storage unit configured to store VNF capacity information indicating a traffic volume per unit time processible by one VNF of the VNFs for a packet size of traffic input to the VNFs;
    a packet size analysis unit configured to analyze a distribution of a plurality of the packet sizes of the traffic input to the VNFs;
    a capacity calculation unit configured to calculate the traffic volume per unit time processible by one VNF based on the VNF capacity information and the distribution of the packet sizes input to the VNFs;
    a necessary resource amount calculation unit configured to calculate a necessary resource amount which is a difference between a total resource amount necessary for forwarding of the traffic to the VNFs and a total resource amount provided by existing VNFs; and
    an installation number calculation unit configured to calculate the number of VNFs to be increased or decreased to process the traffic based on the traffic volume per unit time processible by one VNF, which is calculated by the capacity calculation unit, and the necessary resource amount calculated by the necessary resource amount calculation unit.

2. The control device according to claim 1, wherein the traffic volume is a number of packets and a number of bits per unit time.

3. The control device according to claim 1, further comprising:
    an existing provision resource amount calculation unit configured to calculate the total resource amount provided by the existing VNFs based on a number of existing VNFs and the traffic volume per unit time processible by one VNF, which is calculated by the capacity calculation unit.

4. The control device according to claim 1, further comprising:
    a flow collector unit configured to detect traffic to be forwarded to the VNFs by sampling the traffic, wherein the packet size analysis unit is configured to analyze, as the distribution of the packet sizes of the traffic input to the VNFs, a distribution of packet sizes of traffic detected as the traffic to be forwarded to the VNFs by the flow collector unit.

5. The control device according to claim 1, further comprising:
    a flow collector unit configured to detect traffic to be forwarded to the VNFs by sampling the traffic, wherein the packet size analysis unit is configured to analyze, as the distribution of the packet sizes of the traffic input to the VNFs, a distribution of packet sizes of traffic sampled by the flow collector unit, and
    the capacity calculation unit is configured to use, from the analyzed distribution of the packet sizes of the traffic, a distribution of packets of traffic detected as the traffic to be forwarded to the VNFs, when the traffic volume per unit time processible by one VNF is calculated.

6. A control method executed by a control device configured to calculate a number of Virtual Network Functions (VNFs) to be installed to process traffic, the control method comprising:
    analyzing a distribution of packet sizes of traffic input to the VNFs;
    calculating a traffic volume per unit time processible by one VNF of the VNFs based on VNF capacity information indicating a traffic volume per unit time processible by one VNF for a packet size of the traffic input to the VNFs and the distribution of the packet sizes input to the VNFs;
    calculating a necessary resource amount which is a difference between a total resource amount necessary for forwarding of the traffic to the VNFs and a total resource amount provided by existing VNFs; and
    calculating the number of VNFs to be increased or decreased to process the forwarded traffic based on the calculated traffic volume per unit time processible by one VNF and the calculated necessary resource amount.

* * * * *